Oct. 29, 1957  D. D. BEALE ET AL  2,811,182
RADIAL ARM POWER TOOL
Filed April 29, 1953  3 Sheets-Sheet 1
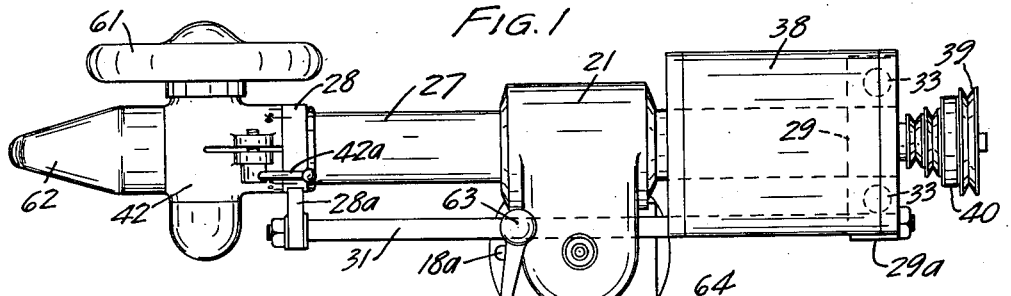
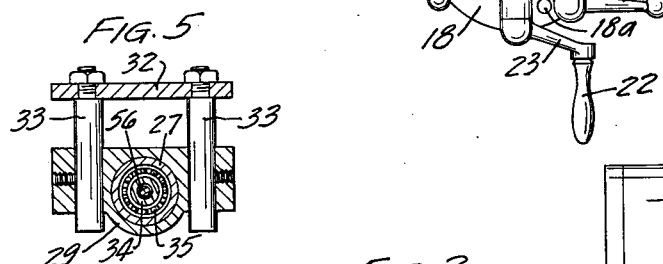
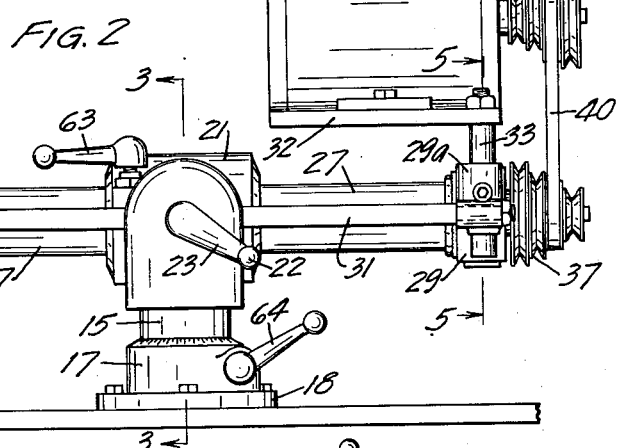
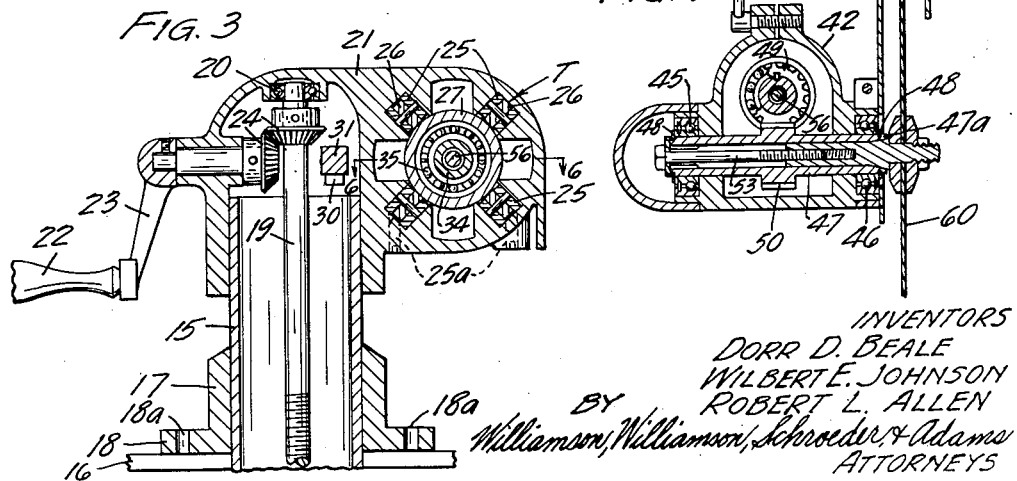
INVENTORS
DORR D. BEALE
WILBERT E. JOHNSON
ROBERT L. ALLEN
BY Williamson, Williamson, Schroeder, & Adams
ATTORNEYS Oct. 29, 1957  D. D. BEALE ET AL  2,811,182
RADIAL ARM POWER TOOL
Filed April 29, 1953  3 Sheets-Sheet 2
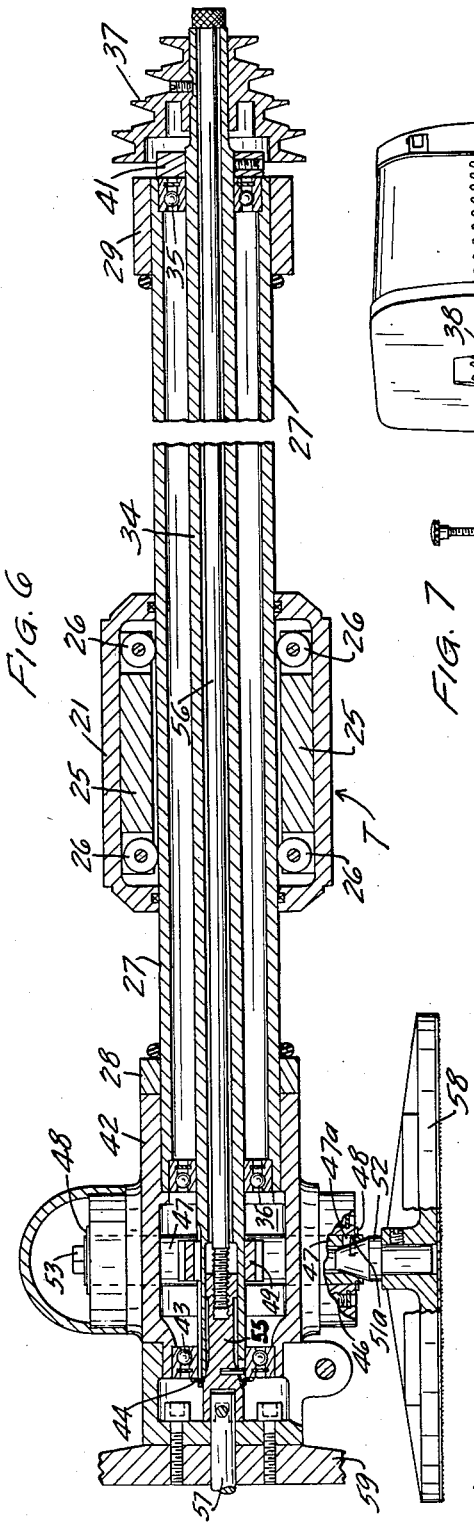
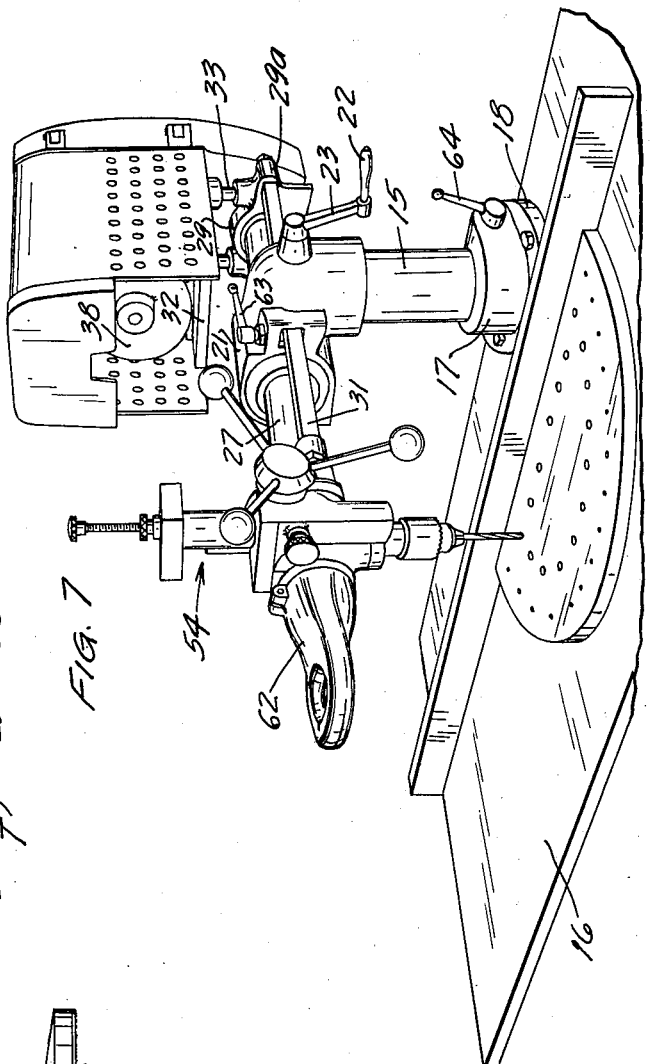
INVENTORS
DORR D. BEALE
WILBERT E. JOHNSON
ROBERT L. ALLEN
BY
Williamson, Williamson, Schroeder, & Adams
ATTORNEYS

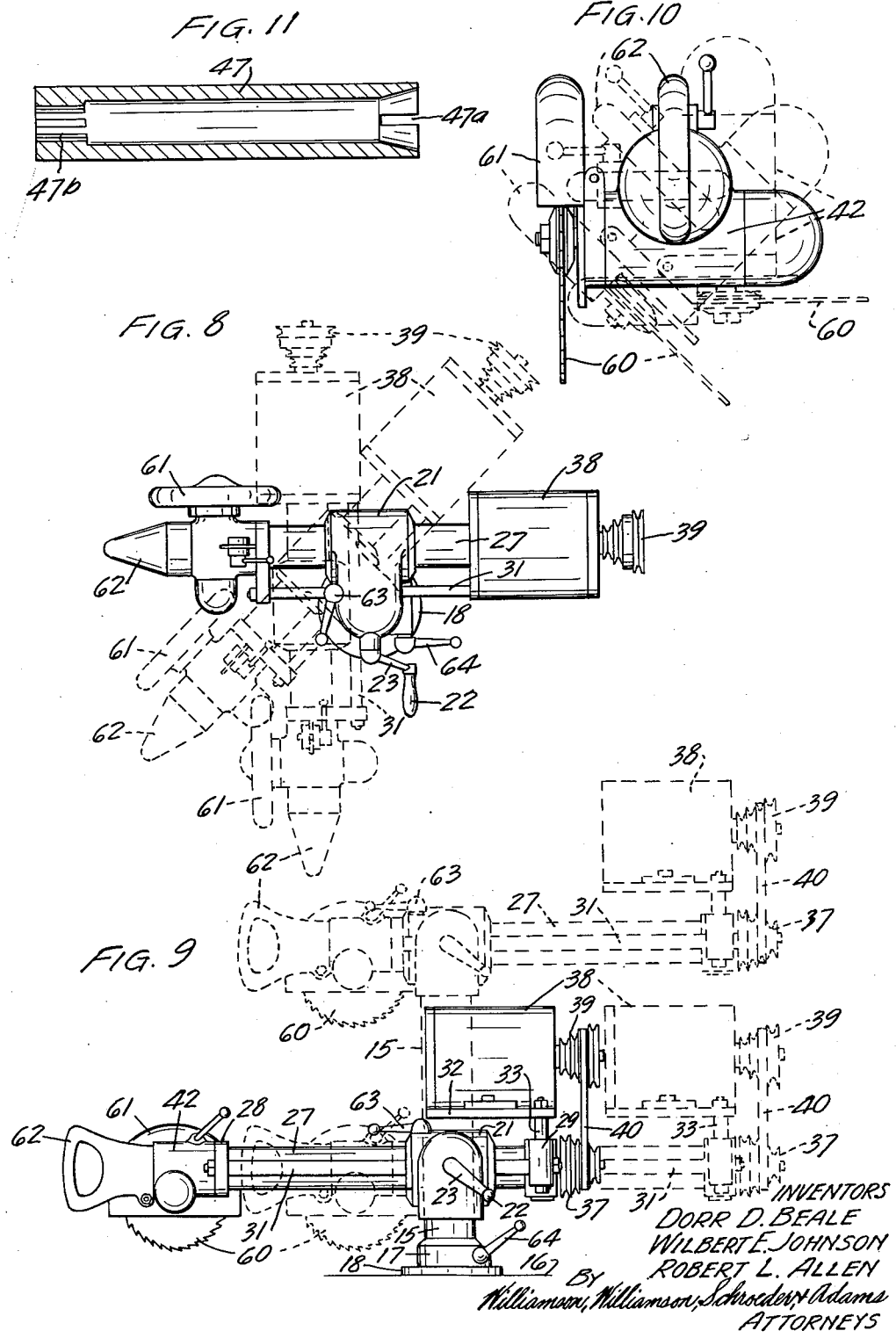

United States Patent Office 2,811,182
Patented Oct. 29, 1957

2,811,182

RADIAL ARM POWER TOOL

Dorr D. Beale, Minneapolis, Wilbert E. Johnson, Forest Lake, and Robert L. Allen, Minneapolis, Minn., assignors to Shopmaster, Inc., Minneapolis, Minn., a corporation of Minnesota Application April 29, 1953, Serial No. 351,976

1 Claim. (Cl. 143—6)

This invention relates generally to a radial arm power tool particularly adapted for use with a wide variety of different power driven operative units.

All radial arm power tools have, in the past, mounted the motor power source and tool arbor directly driven thereby in adjacent relation, thus producing a clumsy and heavy tool head unit requiring a complicated supporting carriage which, of necessity, produces a relatively large bending moment by the localized eccentrically disposed weight slidably supported from the radial arm which itself is not mounted for rectilinear movement. The mounting of the motor adjacent the tool produces problems in the changing of the tool units which are solved only by relatively expensive and complicated tool mounting apparatus which obviously does not lend itself to quick changing from one tool to another and does not produce a long wearing, smoothly operating transfer mechanism permitting the rectilinear movement of the tool and the supporting arm.

It is an object of our invention to provide an extremely versatile radial arm power tool particularly adapted for substantially universal application to the various power tools while producing a highly stable and accurate long wearing tool mounting arm.

It is another object to provide a radial arm power tool wherein a horizontally disposed mounting arm structure is supported for horizontal rectilinear back and forth movement within a linear slide bearing securely supported against horizontal rectilinear movement.

It is still another object to provide a radial arm power tool having a horizontally disposed mounting arm structure supported for horizontal rectilinear movement as well as horizontal swinging movement and having the motor power source mounted at one free end thereof and the power tool to be driven by said power source mounted on the other free end thereof with a positive driving connection interconnecting the motor and the tool to be driven thereby, thus producing a counter-balanced, substantially symmetrical weight distribution on the linear slide bearing supporting said arm to provide a long wearing, highly accurate and stable shifting action for said arm both rectilinearly and in the horizontal swinging movement thereof.

More specifically, it is an object to provide a radial arm power tool having an elongated mounting arm having the intermediate portions thereof carried by a supporting rectilinear linear slide bearing with means for preventing rotation of said arm on its longitudinal axis, said arm being hollow with a drive shaft extending the full length thereof, a motor power source mounted on one free end of said arm and connected with the adjacent end of said drive shaft with means at the other end of said arm for mounting a power tool thereon in driving connection with the other end of said drive shaft.

Still more specifically, it is an object to provide a multiple-purpose, highly versatile and easily convertible radial arm power tool having a horizontally disposed hollow tubular mounting arm member supported solely at intermediate portions thereof by a linear slide bearing to permit back and forth horizontal rectilinear movement of said arm, said linear slide bearing being positively held against horizontal rectilinear movement, a horizontal stabilizing bar rigidly fixed to said arm in laterally spaced parallel relation thereto and slidably supported to permit longitudinal rectilinear shifting movement thereof, but said bar supporting means positively preventing rotational movement thereof to positively hold said tubular arm member against rotation on its longitudinal axis, said bar having means for releasably locking the same against longitudinal shifting movement to maintain a desired adjusted longitudinal position of said arm, said hollow arm having a main drive shaft journalled therewithin and extending the full length thereof with a motor power source connected at one end thereof and a tool mounting and driving head connected with the other end thereof, said head having a cross shaft journalled therein in driving connection with the adjacent end portion of said main drive shaft and said head including means permitting quick and positive interchangeable mounting of a selected tool to be driven by one of said shafts.

It is another specific object of our invention to provide a power tool having a remote motor power source and a tool mounting head disposed in spaced relation therefrom, with a pair of drive shafts disposed at right angles, one to the other, and having positive driving connection therebetween, one of said shafts being connected for driving with said power source to produce positive driving of both shafts and provide a three-sided driving head, each side being particularly adapted for connection with a selected power driven tool for driving the same.

It is a more specific object to provide a tool mounting head having a pair of drive shafts disposed at substantially right angles, one to the other, and having positive driving means interconnecting the same, a driving connection on one of said shafts for connection with a power source disposed remotely of the head, a mounting for said shafts to permit adjustable rotation of one shaft on the longitudinal axis of the other shaft, said shafts having provision for driving attachment of a selected tool thereto.

These and other objects and advantages of our invention will more fully appear from the following description made in connection with the accompanying drawings wherein like reference characters refer to the same or similar parts throughout the several views, and in which:

Fig. 1 is a top plan view of our new tool;

Fig. 2 is a side elevational view thereof;

Fig. 3 is an enlarged fragmentary vertical sectional view taken substantially along the line 3—3 of Fig. 2;

Fig. 4 is a fragmentary vertical sectional view taken substantially along the broken line 4—4 of Fig. 2;

Fig. 5 is a fragmentary vertical sectional view taken substantially along line 5—5 of Fig. 2;

Fig. 6 is a central horizontal sectional view of the mounting arm and tool mounting head with the linear slide bearing shown rotated through 45°;

Fig. 7 is a perspective view of our tool with a drill press attached thereto;

Fig. 8 is a diagrammatic plan view showing the mounting arm in a number of different circumferentially arranged positions by dotted lines;

Fig. 9 is a side elevational view thereof showing two rectilinear positions, one by full lines and one by dotted lines, and showing an elevated position of the tool by dotted lines;

Fig. 10 is an end elevational view showing the axial rotary adjustment of the tool mounting and driving head by full and dotted lines positions; and Fig. 11 is a central longitudinal vertical sectional view of the hollow cross drive shaft per se.

As illustrated in the accompanying drawings, and as best shown in Fig. 3, we provide a vertically upstanding support post 15 securely anchored to any suitable flat-topped supporting structure such as the bench 16, best shown in Fig. 7 by a sleeve 17 having an attachment flange 18 with attachment apertures 18a formed therethrough. The post 15 is, of course, vertically slidable in sleeve 17 and a screw shaft 19 provides a suitable means for vertically adjusting the position of said post 15. The upper end of said screw shaft is journalled in a suitable bearing 20 mounted in the support casting 21 and an adjustment handle 22 fixed to crank arm 23 actuates a pair of bevel gears 24 which are intermeshed to positively drive screw shaft 19. The lower end of said screw shaft 19 is, of course, threadably received in a suitable nut (not shown) which nut is, of course, positively held against rotation and shifting movement in spaced relation below flange 18. This nut mounting mechanism is, of course, of conventional design and, therefore, the details thereof are not illustrated.

The support casting 21 is, of course, positively held by said post 15 against horizontal rectilinear movement. A linear slide bearing T is mounted in said casting 21 and has a number of peripherally spaced, general radially disposed bearing receiving recesses formed therewithin and a bearing block 25 is securely anchored in each of these recesses. Each block 25 carries a pair of hardened, arm engaging rollers 26 respectively journalled at the end portions thereof. The details of this bearing are fully disclosed and claimed in our application to be subsequently filed and entitled "Linear Slide Bearing Structure."

A mounting arm 27 is slidably inserted through said linear slide bearing and the rollers 26 permit smooth and accurately guided, back and forth rectilinear horizontal movement of said arm to permit accurate positioning thereof. In the form shown, the mounting arm 27 consists in an elongated hollow tubular member with a hardened outer surface to minimize the wear thereon. A pair of bar-carrying brackets 28 and 29 having laterally extending portions 28a and 29a are fixed to the respective end portions of tubular arm 27 by any suitable means such as by being set-screwed thereto and the ends of a stabilizing bar 31 are respectively fixed in said laterally extending portions 28a and 29a to position said bar in parallel laterally spaced relation to said elongated arm 27. The bar 31 slidably extends through an apertured portion of support casting 21 and rides on an underlying slide pin 30, as best shown in Fig. 3, to permit only back and forth reciprocating rectilinear movement of said arm.

Suitable dust seals are provided at the ends of bearing T such as the annular dry felt seals retained in annular grooves formed on the inside of casting 21, see Fig. 6. As best shown in Fig. 3, adjustment pin 25a is threadably inserted below each of the lower blocks 25 to permit take-up of said blocks toward the engaged surfaces of the tubular arm 27 in the event of wear on the rollers 26 or said engaged surfaces of said arm, thus permitting the smooth and accurate sliding support of said arm 27 in horizontal position to be maintained by said linear slide bearing. As best shown in Figs. 1 and 2, bracket 29 not only rigidly interconnects one end of bar 31 with the adjacent end of mounting arm 27, but also provides a support for a motor mount platform 32 which, in the form shown, is carried by a pair of depending posts 33 which are adjustably set-screwed to said bracket 29 to permit the motor mount platform 32 to be adjustably raised and lowered.

Referring now to Fig. 6, an elongated main drive shaft 34 which, in the form shown, consists in a hollow tubular member, extends concentrically through the hollow mounting arm 27 and is journalled therewithin a pair of rotary bearings 35 and 36. A driving pulley 37 of stepped construction is mounted in fixed relation on the end of drive shaft 34 adjacent bracket 29 and bearing 35. A source of rotary driving power such as an electric motor 38 is mounted on the motor support platform 32, as best shown in Fig. 2, and drives a cooperatively stepped pulley 39 which is connected with pulley 37 by the V-belt 40. Suitable means for holding shaft 34 against longitudinal shifting movement may be provided such as a collar 41 which is set-screwed thereto between bearing 35 and pulley 37.

A mounting head casting 42 is journalled on the end of tubular mounting arm adjacent bearing 36 for rotation on an axis disposed longitudinally of said arm. As best shown in Fig. 1, the inner end of casting 42 is split and a pair of clamping ears are formed on the two sections thereof with a screw interconnecting the same for positively locking said casting in adjusted rotated position on the tool end of arm 27. A suitable actuating handle 42a is provided for turning the clamping screw. A third bearing 43 (Fig. 6) is mounted in the outer end portion of casting 42 in opposed, spaced and aligned relation with bearings 35 and 36 and the hollow drive shaft 34 extends outwardly beyond bearing 36 with the outer end thereof journalled in bearing 43. Suitable means are provided for locking this end of shaft 34 against longitudinal shifting movement such as the split locking ring 44 which is securely anchored in a suitable groove provided in the outer end portion of said shaft 34. The portion of casting 42 normally disposed below drive shaft 34 has a pair of bearings 45 (Fig. 4) and 46, respectively mounted in the lateral end portions thereof, as best shown in Fig. 6, and a hollow cross shaft 47 is journalled in said bearings. Suitable means for locking said cross shaft 47 against longitudinal shifting movement are provided such as the locking rings 48 respectively mounted in grooves formed in the end portions of said shaft. A suitable driving connection between shafts 34 and 47 is provided such as the helical gears 49 and 50 respectively fixed to said shafts 34 and 47, as best shown in Fig. 4, as by being respectively keyed thereto.

The hollow cross shaft 47 is inwardly tapered at one end thereof with a slot 47a (Fig. 11) formed at the end adjacent said taper to receive a projecting pin 51a (Fig. 6) provided in an arbor 52 having a cooperating centering taper which is received in the tapered portion of said shaft 47. A locking rod 53 (Fig. 4) extends through said shaft 47 and is cooperatively threadably received in the inner end of arbor 52 to securely hold the tapered arbor portion against the tapered shaft portion and positively maintain said arbor and said shaft in driving position. The end of said shaft 47 opposite to the tapered end is splined as indicated at 47b of Fig. 11 to provide a splined driving element for use with such tools as the drill press attachment designated as an entirety by the numeral 54 and best shown in Fig. 7.

The portions of casting 42 surrounding the respective bearings 43, 45 and 46 are cylindrical in shape to provide clamping attachment portions for parts of the various tool-attachment mechanisms which are adapted to be quickly and easily attached to said head to be driven thereby, the stationary portions of said attachments being anchored to said cylindrical attachment portions of the head casting 42 and the driven portions being connected with the driving connections of the shaft 47 or shaft 34.

The tool end of shaft 34 has a tapered arbor centering portion with a pin-receiving slot formed therein generally similar to the tapered driving end of shaft 47 and, in Fig. 6, an arbor 55 is connected therewith and an elongated locking rod 56 extends substantially the full length of hollow shaft 34 and threadably anchors said arbor 55 in driving position at the tool end of said shaft. The details of this double hollow drive shaft construction are disclosed in an application to be subsequently filed thereon and entitled "Multiple Purpose Power Tool Drive." The arbor 55 has a pair of cross driving slots formed therein to receive a pinned drive shaft such as the belt-sander drive shaft 57 shown in Fig. 6. As illustrated in Fig. 6, our device is adapted to permit the simultaneous attachment of more than one tool such as a disc-sander 58 connected with the cross shaft 47 and a belt-sander mechanism, a fragmentary portion of which is shown in Fig. 6 and is designated by the numeral 59, and is driven by shaft 57.

Figs. 1, 2, 4, 8, 9 and 10 all show our tool with a circle saw 60 attached thereto and the saw guard 61 surrounding the same is attached to the adjacent cylindrical attachment portion of mounting casting 42, as best shown in Fig. 4. For use with the circle saw, which is driven by the cross shaft 47, a gripping handle 62 is securely mounted in longitudinally extending position on the cylindrical attachment portion surrounding end bearing 43 at the end of main drive shaft 34 and thus facilitates shifting the saw into the desired operative positions. The same handle 62 is used with drill press 34 and, of course, may be rotated through ninety degrees into the position illustrated in Fig. 7.

Suitable locking mechanisms for securely locking the tool mounting head in the desired adjusted position are provided. The clamping screw operated by handle 42a locks the head against rotary movement on an axis disposed longitudinally of arm 27. A set screw type of locking clamp actuated by lever 63 securely clamps bar 31 against the underlying opposed button 30 and positively holds arm 27 against rectilinear movement and, finally, a suitable clamp of conventional design actuated by handle 64 is provided to positively lock the upstanding post member 15 against rotation on its vertical axis within sleeve 17.

The provision of a three-sided tool mounting and driving head disposed remotely of the power source permits easy accessibility and extremely versatile adjustability thereof and greatly facilitates not only accurate operation thereof, but also quick and easy changing from one tool to another. It should be noted that the driving arbors of the various tools to be mounted on said head may be quickly and easily changed to permit the use of special arbors for the respective tools. By mounting the motor remotely of the tool head, it is relatively easy to obtain the desired direction and speed of rotation for the different units, since different speeds are, of course, required for the various units and also the desired direction of rotation of the various units may be different. Obviously, one end of the cross shaft 47 will be driven in a clockwise direction and the other end will be driven in a counter-clockwise direction so that a choice of driving direction is provided. The saw, for example, should of course be rotated in a direction for throwing the sawdust rearwardly away from the operator as the saw is pulled toward the operator through the boards being cut.

It will be seen that we have provided a relatively simple, yet highly efficient, radial arm saw which is particularly adapted for quick and easy conversion from one selected power tool to another, and a wide variety of different power tools such as a drill press, belt and disc sanders and routers, as well as a power saw, may be easily and quickly attached thereto. The tool mounting head with a cross shaft permits quick and easy attachment of a selected tool. This cross shaft will, of course, produce rotation in one direction when positioned vertically with one end up and will produce rotation in the other direction when vertically positioned with the other end up, and, of course, this adjustment can be made by merely swinging the head about the main shaft as an axis. By positioning the motor remotely of the operating tool head, the driving speed of the main shaft can be quickly and easily varied for the different tools to be used. The provision of quickly and easily changeable arbors adds materially to the versatility of our new, multipurpose power tool.

It will, of course, be understood that various changes may be made in the form, details, arrangement and proportions of the parts without departing from the scope of our invention which, generally stated, consists in the matter shown and described herein and set forth in the appended claim.

What we claim is:

A multi-purpose power tool of the radial arm type, comprising a support sleeve having a vertical bore, a vertical post projecting through said bore and slidable axially therethrough, a hollow support head fixedly receiving the upper end of said post, a vertical screw shaft disposed within said post and having its upper end journalled in said support head, gear means on said shaft and support head for rotating the screw shaft to vertically adjust said support head and post relative to said sleeve, said support head including a laterally projecting boss-like portion provided with a horizontal opening, a linear slide bearing assembly disposed within said horizontal opening, a horizontal cylindrical tubular mounting arm slidably received through said slide bearing, a stabilizing bar fixed at opposite ends to said mounting arm and disposed in spaced, parallel relation thereto, said stabilizing bar projecting through said head to one side of said screw shaft to prevent axial rotation of said mounting arm, a motor assembly fixed to one end of said mounting arm, a mounting head mounted on the other end of said mounting arm, means releasably clamping said mounting head on said mounting arm to permit selected relative rotation of the mounting head on the arm, a drive shaft journalled concentrically within and projecting through said mounting arm, means for connecting said drive shaft to said motor assembly for rotation thereby, a cross shaft journalled within said mounting head in spaced, right angular relation to said drive shaft, gear means interconnecting, said drive shaft and said cross shaft, and a rotary tool fixed to said cross shaft externally of said mounting head.

References Cited in the file of this patent

UNITED STATES PATENTS

| | | |
|---|---|---|
| 910,145 | O'Hara | Jan. 19, 1909 |
| 1,014,708 | Hutchinson | Jan. 16, 1912 |
| 1,322,644 | Steiner | Nov. 25, 1919 |
| 1,543,051 | Bloodgood | June 23, 1925 |
| 1,628,845 | Jackson | May 17, 1927 |
| 2,071,005 | Swickard | Feb. 16, 1937 |
| 2,158,444 | Wardle | May 16, 1939 |
| 2,412,704 | Jaques | Dec. 17, 1946 |
| 2,627,880 | Johnson | Feb. 10, 1953 |
| 2,664,119 | Spearman | Dec. 29, 1953 |

FOREIGN PATENTS

| | | |
|---|---|---|
| 785,882 | France | May 27, 1935 |
| 434,231 | Germany | Sept. 17, 1926 |